United States Patent
Kulprathipanja et al.

(10) Patent No.: US 9,370,758 B2
(45) Date of Patent: Jun. 21, 2016

(54) PROCESS FOR TRANSFERRING CATALYST AND AN APPARATUS RELATING THERETO

(71) Applicant: UOP, LLC, Des Plaines, IL (US)

(72) Inventors: Sathit Kulprathipanja, Schaumburg, IL (US); Paolo Palmas, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 581 days.

(21) Appl. No.: 13/850,440

(22) Filed: Mar. 26, 2013

(65) Prior Publication Data

US 2014/0294694 A1   Oct. 2, 2014

(51) Int. Cl.
*B01J 8/18* (2006.01)
*F27B 15/00* (2006.01)
*B01J 8/00* (2006.01)
*B65G 53/08* (2006.01)

(52) U.S. Cl.
CPC . *B01J 8/002* (2013.01); *B65G 53/08* (2013.01)

(58) Field of Classification Search
CPC .................................. C10G 11/18; B01J 8/26
USPC .................................................. 422/139–140
See application file for complete search history.

(56) References Cited

U.S. PATENT DOCUMENTS

| | | | |
|---|---|---|---|
| 2,853,455 A | 9/1958 | Campbell et al. | |
| 3,470,084 A | 9/1969 | Scott | |
| 3,873,441 A * | 3/1975 | Jones | B01J 8/003 208/166 |
| 4,288,407 A * | 9/1981 | Markel et al. | B01J 8/42 422/143 |
| 4,430,302 A | 2/1984 | Krause | |
| 5,314,012 A | 5/1994 | Mosse et al. | |
| 5,324,421 A | 6/1994 | Rahlwes | |
| 5,338,440 A * | 8/1994 | Sechrist | B01J 8/001 208/173 |
| 5,417,492 A | 5/1995 | Christian et al. | |
| 5,505,392 A | 4/1996 | Tunnicliffe et al. | |
| 5,567,390 A | 10/1996 | Cleary | |
| 5,615,969 A | 4/1997 | Tunnicliffe et al. | |
| 5,628,260 A * | 5/1997 | Rongved | B01J 8/087 110/245 |
| 5,992,512 A | 11/1999 | Tsuri et al. | |
| 6,730,274 B1 | 5/2004 | Ideguchi et al. | |
| 6,884,400 B1 * | 4/2005 | Austin | B01J 8/12 422/145 |
| 7,261,807 B2 | 8/2007 | Henry et al. | |
| 7,312,370 B2 | 12/2007 | Pittman et al. | |
| 8,163,170 B2 | 4/2012 | van Egmond et al. | |
| 2002/0147370 A1 | 10/2002 | Hinz et al. | |
| 2005/0019245 A1* | 1/2005 | Koulikov | B82Y 30/00 423/447.3 |
| 2007/0240408 A1 | 10/2007 | Evans-Beauchamp | |
| 2008/0035527 A1 | 2/2008 | Eng et al. | |
| 2008/0251438 A1 | 10/2008 | Yu et al. | |
| 2008/0295356 A1 | 12/2008 | Nickerson | |

(Continued)

FOREIGN PATENT DOCUMENTS

WO   2011031249   3/2011

OTHER PUBLICATIONS

Andersson, "Minimising Refinery Costs Using Spiral Heat Exchangers", Petroleum Technology Quarterly, Apr./May/Jun. 2008, vol. 13, No. 2, pp. 75-76, 79-80, 83-84.

(Continued)

*Primary Examiner* — Nina Bhat
(74) *Attorney, Agent, or Firm* — James C. Paschall

(57) ABSTRACT

One exemplary embodiment can be a process for transferring catalyst in a fluid catalytic cracking apparatus. The process can include passing the catalyst through a conveyor wherein the conveyor contains a screw for transporting the catalyst.

20 Claims, 3 Drawing Sheets

(56) References Cited

U.S. PATENT DOCUMENTS

| | | |
|---|---|---|
| 2009/0035198 A1* | 2/2009 | Fecteau ............... B01J 8/125 422/216 |
| 2010/0170665 A1 | 7/2010 | Lovato |
| 2010/0189517 A1* | 7/2010 | Naunheimer ......... C10G 49/14 406/23 |
| 2010/0263269 A1 | 10/2010 | Dunlop et al. |
| 2011/0252698 A1 | 10/2011 | Camper et al. |
| 2011/0314728 A1 | 12/2011 | Camper et al. |
| 2012/0193079 A1 | 8/2012 | Briselden |
| 2012/0272569 A1 | 11/2012 | Dunlop et al. |

OTHER PUBLICATIONS

Haraburda, "Three-Phase Flow? Consider Helical-Coil Heat Exchangers", Chemical Engineering, Jul. 1995, vol. 102, No. 7, pp. 149-150, 152.

Johnson, "Improve Regenerator Heat Removal", Hydrocarbon Processing, Nov. 1991, vol. 70, No. 11, pp. 55-57.

Targett et al., "Solutions in Closed Form for a Double-Spiral Heat Exchanger", Industrial Engineering Chemistry Research, Mar. 1992, vol. 31, No. 3, pp. 658-669.

U.S. Appl. No. 13/425,657, filed Mar. 21, 2012, Palmas.

* cited by examiner

PROCESS FOR TRANSFERRING CATALYST AND AN APPARATUS RELATING THERETO

FIELD OF THE INVENTION

This invention generally relates to a process for transferring catalyst, and an apparatus relating thereto.

DESCRIPTION OF THE RELATED ART

Current catalyst withdrawal systems for fluid catalytic cracking apparatuses can have catalyst erosion issues resulting in shortened operations. Erosion can occur at the piping assembly near an air injection, at valves, and with internal components. Also the inclusion of finned piping can create difficulties in finding suitable piping at acceptable cost. Additionally, the withdrawal of catalyst in current systems may also have plugging issues. Furthermore, conventional withdrawal systems may not sufficiently cool the withdrawn catalyst from the hot regenerator to a cold equilibrium catalyst hopper. What is more, it would be desirable to recover heat from the withdrawn catalyst to be utilized in plant utilities.

A current fluid catalyst cracking shell and tube cooler with a slide valve can be very expensive and create reliability concerns during normal operation with erosion and plugging. Preferably, an alternative can be provided that alleviates the erosion and plugging issues, as well as allow recovery of heat.

SUMMARY OF THE INVENTION

One exemplary embodiment can be a process for transferring catalyst in a fluid catalytic cracking apparatus. The process can include passing the catalyst through a conveyor. The conveyor may contain a screw for transporting the catalyst.

Another exemplary embodiment may be a fluid catalytic cracking apparatus. The apparatus can include a riser-reactor including a riser terminating in a reaction vessel, a regeneration vessel communicating with the riser-reactor for receiving spent catalyst from the riser-reactor and for sending regenerated catalyst to the riser-reactor, and a conveyor positioned in the line for facilitating transfer of the catalyst. Often, the regeneration vessel includes a line for transferring catalyst within the regeneration vessel and the conveyor contains a shaft coupled to a thread.

A further exemplary embodiment can be a process for transferring catalyst in a fluid catalytic cracking apparatus. The process may include passing the catalyst through a conveyor. The conveyor may contain a screw for transporting the catalyst communicating with different portions of a shell of a regeneration vessel and passing the catalyst through another conveyor. This another conveyor may also contain a screw for transporting catalyst for disposal.

The catalyst withdrawal cooling screw assembly can allow the refiner to remove the catalyst daily without having air injection at the assembly, thus generally minimizing erosion. The cooling screw assembly can also be easily available as such designs are often used in cooling dense phase solid transfer in other industrial applications. Using a variable speed motor cooling screw conveyor may move the hot catalyst while the heat transfer can occur between the hot catalyst to the jacket and shaft while cooling water may remove heat from the screw conveyor. Because the heat transfer is done via dense phase conveying, finned piping is not required and erosion is less severe as with a rapid, dilute phase system.

A fluid catalytic cracking cooling screw conveyor may provide a lower cost, an easy to operate alternative to cooling the catalyst and provide a heated water supply to a flue gas steam generator for steam generation. The cooling screw conveyor does not have many internal parts other than the screw to operate at low rotations per minute to minimize erosion and move the hot catalyst along the shaft from the regeneration vessel.

The cooling medium, such as water, may circulate along the jacket and or along the shaft picking up heat from the hot catalyst while cooling the catalyst down as required from the heat balance of the apparatus. The cooled catalyst can return to the regeneration vessel. The hot water may be sent to various locations as required within the refinery. In the fluid catalytic cracking apparatus, this hot water can be routed to the economizer of the flue gas steam generator, the desuperheater, and/or the main column bottom steam generator for steam generation.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Furthermore, a superscript "+" or "−" may be used with an abbreviated one or more hydrocarbons notation, e.g., $C^{3+}$ or $C^{3-}$, which is inclusive of the abbreviated one or more hydrocarbons. As an example, the abbreviation "$C^{3+}$" means one or more hydrocarbon molecules of three carbon atoms and/or more. A "stream" may also be or include substances, e.g., fluids or substances behaving as fluids, other than hydrocarbons, such as air or catalyst.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a staple, or a rivet; an adhesive; or a solder.

As used herein, the term "hour" may be abbreviated "hr", the term "kilogram" may be abbreviated "kg", the term "kilopascal" may be abbreviated "KPa", and the terms "degrees Celsius" may be abbreviated "° C.".

As depicted, process flow lines in the figures can be referred to interchangeably as, e.g., lines, pipes, feeds, products, or streams.

DETAILED DESCRIPTION

Figure 1:
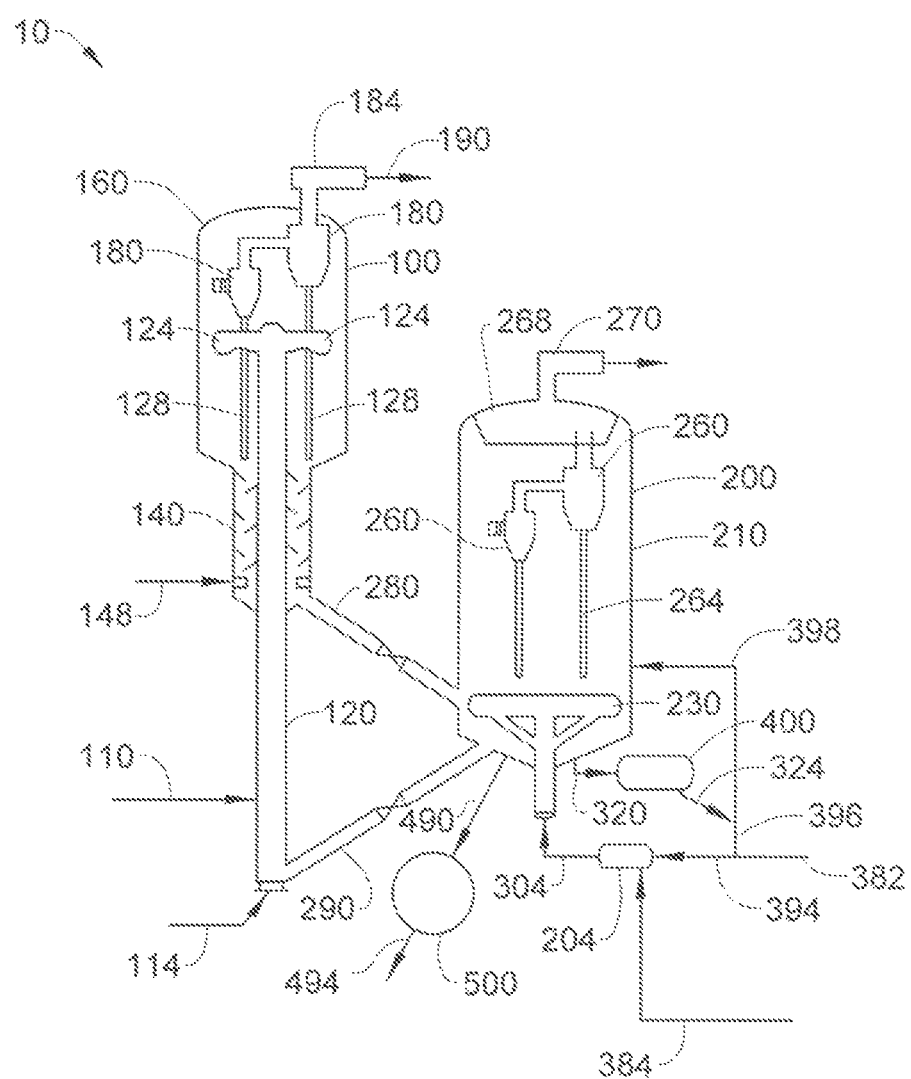
FIG. 1 is a schematic, cross-sectional view of an exemplary fluid catalytic cracking apparatus.

Referring to FIG. 1, a fluid catalytic cracking apparatus 10 can include a riser-reactor 100 and a regeneration vessel 200.

The riser-reactor 100 can include a riser 120 that terminates inside a reaction vessel 160. The riser 120 can terminate in one or more disengaging arms 124 that may separate the hydrocarbons from the catalyst. The reaction vessel 160 can also contain one or more cyclone separators 180 that can communicate one or more hydrocarbons to an outlet 184. One or more dip legs 128 can provide spent catalyst from the one or more cyclone separators 180 to a stripping zone 140. Any suitable catalyst may be utilized, including a mixture of a plurality of catalysts including an MFI zeolite and a Y-zeolite. Exemplary catalyst mixtures are disclosed in, e.g., U.S. Pat. No. 7,312,370 B2. Exemplary reaction vessels and regeneration vessels are disclosed in, e.g., U.S. Pat. No. 7,261,807 B2; U.S. Pat. No. 7,312,370 B2; and US 2008/0035527 A1.

The regeneration vessel 200 can include a direct fired air heater 204, a shell 210, air grids 230, one or more cyclone separators 260, and a plenum 268. The regeneration vessel 200 may include the one or more cyclone separators 260 having one or more dip legs 264. The one or more separators 260 can communicate flue gases to the plenum 268, in turn communicating the flue gases to an outlet 270. The one or more dip legs 264 can communicate catalyst to the base of the regeneration vessel 200.

In operation, a hydrocarbon feed 110, that may include at least one of a gas oil, a vacuum gas oil, an atmospheric gas oil, a coke oil, a gas oil, a hydrotreated gas oil, a hydrocracker unconverted oil, and an atmospheric residue, can be provided to the riser 120 and fluidized with a gas 114. The hydrocarbon feed 110 can also be contacted with the catalyst provided via a transfer conduit 290, which can be a second transfer conduit 290, to the base of the riser 120. Generally, the regenerated catalyst and feed mixture can be at a temperature of about 500-about 650° C., and a pressure of about 110-about 450 KPa. The catalyst and feed can rise within the riser 120 and separate at the reaction vessel 160 using any suitable device. The catalyst can fall toward the base of the reaction vessel 160 while product gases can rise and be separated from the catalyst. The product gases can enter the outlet 184 and exit as a product stream 190. The hydrocarbon products can be further processed, such as in downstream fractionation zones. An exemplary fractionation zone is disclosed in, e.g., U.S. Pat. No. 3,470,084.

The separated catalyst can pass from the dip legs 128 and fall to the stripping zone 140. A stripping steam 148 can be provided to the stripping zone 140 to strip hydrocarbons. The catalyst can pass through a transfer conduit 280, such as a first transfer conduit 280, to the regeneration vessel 200.

The regeneration vessel 200 can receive spent catalyst through the first transfer conduit 280. A gas, as discussed in further detail hereinafter, can be provided in a line 394 to the direct fired heater 204. The gas, typically air, can pass to the line 304 to the air grids 230 and mix with the spent catalyst from the first transfer conduit 280. The catalyst may be regenerated and fall to the base of the regeneration vessel 200. Furthermore, the one or more cyclone separators 260 can receive a mixture of flue gas and entrained catalyst. Catalyst can be separated in the one or more cyclone separators 260 and pass through the dip legs 264 and also fall to the base of the regeneration vessel 200. From the base, the regenerated catalyst along with any make-up catalyst can pass through the second transfer conduit 290 to the riser 120. Separated flue gases rise from the one or more cyclone separators 260 to the plenum 268 and exit via the outlet 270. Generally, the direct fired heater 204 can combust any suitable fuel 384, such as an auxiliary fuel, including a fuel gas. Often, the direct fired heater is used during initialization of the fluid catalytic cracking apparatus 100, but is not activated during steady-state operations. The regeneration vessel 200 can operate at any suitable temperature, such as above about 650° C. or other suitable conditions for removing coke accumulated on the catalyst particles.

Catalyst can be recirculated within the regeneration vessel 200 by passing through a conduit 320 and to a first conveyor 400, as further described herein. Catalyst cooled by the first conveyor 400 may pass through a line 324 and into a line 398 returning the catalyst to the regeneration vessel 200. Catalyst in the line 398 can be fluidized by air in the line 382, and another part of the air provided to the line 394.

Catalyst may also be removed from the regeneration vessel 200 via a line 490 and passed to a second conveyor 500, as hereinafter described. Cooled catalyst may be withdrawn via a line 494.

Figure 2:
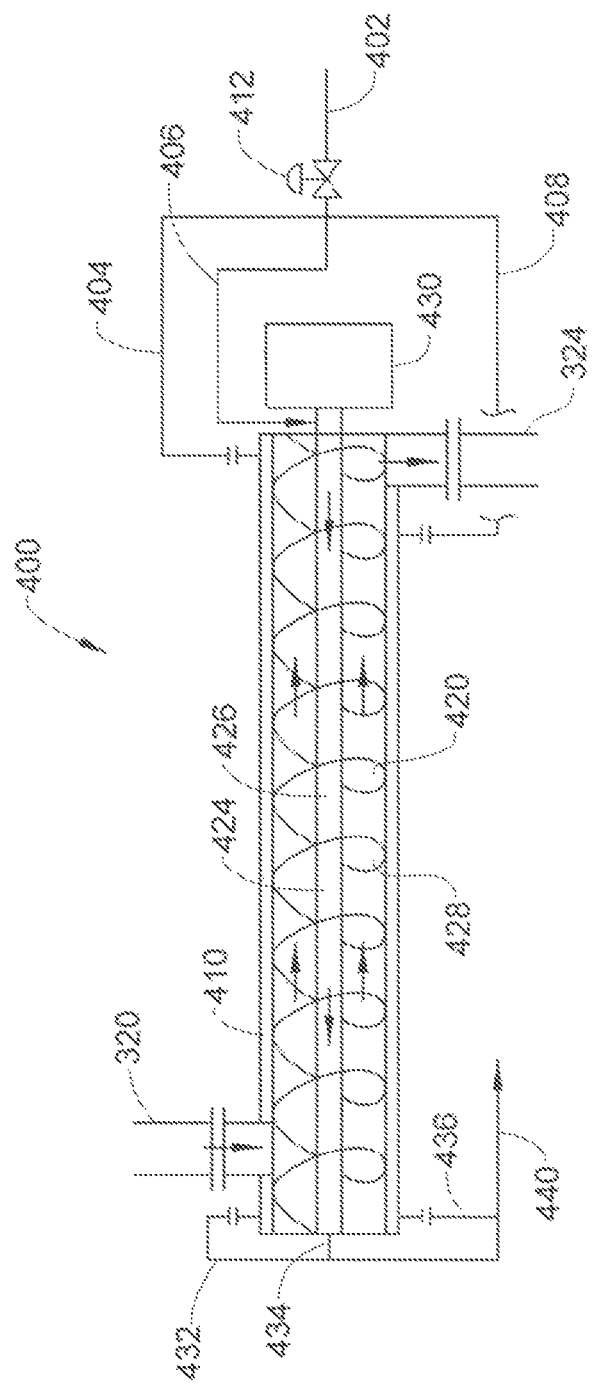
FIG. 2 is a schematic, cross-sectional view of an exemplary first conveyor.

Referring to FIG. 2, the first conveyor 400 can include a jacket 410, typically a water jacket, a screw 420, and a variable speed motor 430. Catalyst withdrawn from the regeneration vessel 200 via the conduit 320 can enter the conveyor 400 and be moved via the screw 420. Usually, the catalyst exits the line 324. The screw 420 can include a shaft 424 forming a void 426 therein and have one or more helical threads or blades 428 coupled to the shaft 424. The one or more helical threads 428 can optionally be hollow as well. The variable speed motor 430 can be coupled to the screw 420 for rotating the screw 420. The jacket 410 can form spaced apart walls forming an annular structure, i.e., a pair of spaced apart cylinders, for receiving a heat exchange medium therein.

A line 402 can provide the heat exchange medium, such as cooling water, to cool the catalyst. A valve 412 can regulate the water passing in the water line 402. The water line 402 can be split into lines 404, 406, and 408 to provide water to the jacket 410 and the void 426. In some cases, the one or more helical threads 428 may also receive a heat exchange medium. Heat can be transferred from the catalyst to the water and withdrawn via lines 432, 434, and 436 and be combined into a line 440. Generally, the cooling water receives heat from the hot catalyst along the shaft 424 and/or the jacket 410 of the conveyor 400. The cooling water flow can be either counter or co-current flow with the hot catalyst pending the design requirement.

The heated water can be provided to utility services for generating electricity or other utilities. As an example, the heated water can be routed to the economizer of the flue gas steam generator, the desuperheater, and/or the main column bottom steam generator for steam generation.

The variable speed motor 430 can control the speed of the catalyst passing through the jacket 410. Generally, the variable speed motor 430 is operated at a slower speed to prevent fluidization and controls the rate of catalyst circulation in the regeneration vessel 200. Usually, the first conveyor 400 cools the catalyst from at least about 700° C. to no more than about 600° C. and transports about 130,000-about 450,000 kg/hr. An exemplary conveyor is disclosed in, e.g., US 2008/0295356 A1.

Figure 3:
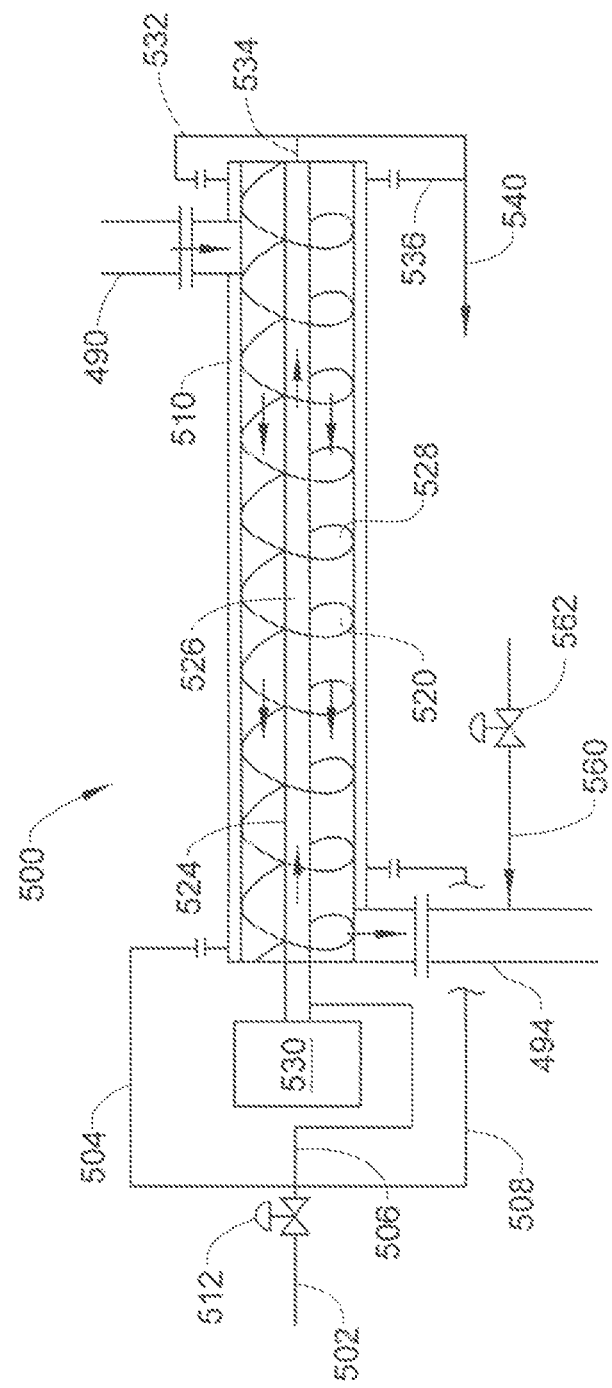
FIG. 3 is a schematic, cross-sectional view of an exemplary second conveyor.

Referring to FIG. 3, the second conveyor 500 can include a jacket 510, typically a water jacket, a screw 520, and a variable speed motor 530, and have substantially the same components and operate similarly as the first conveyor 400. As an example, the screw 520 can include a shaft 524 forming a void 526 and one or more helical threads or blades 528 coupled to the shaft 524. The one or more helical threads 528 optionally can be hollow to receive a heat exchange medium. The variable speed motor 500 can be coupled to the screw 520 to rotate the screw 520. The jacket 510 can form spaced apart walls forming an annular structure, i.e., a pair of spaced apart cylinders, for receiving a heat exchange medium therein. One difference is that the throughput through the second conveyor 500 can be quite less than the throughput through the first conveyor 400. Generally, the second conveyor 500 can cool the catalyst from at least about 700° C. to no more than about 100° C., and transports about 15-about 200 kg/hr.

Catalyst withdrawn from the regeneration vessel 200 can be provided by the line 490 to the second conveyor 500. The catalyst can be transported from the second conveyor 500 via the line 494 to any suitable destination, such as storage, e.g., an equilibrium catalyst hopper, prior to disposal. A line 560 optionally regulated by a valve 562 can provide a fluidizing medium, such as air, to the line 494 to fluidize the catalyst. A line 502 can provide a heat exchange medium, such as water optionally regulated by a valve 512. The line 502 can be split into lines 504, 506, and 508 to provide water to the jacket 510 and the void 526 of the shaft 524. At least a portion of the heat from the catalyst can be transferred to the water, which in turn can pass through lines 532, 534, and 536 to be combined into a line 540 and be used in any suitable utility, such as steam, preferably high pressure, generation.

Although the regeneration vessel 200 is disclosed as being a single stage, it should be understood that first and/or second conveyors may be utilized with any suitable regeneration vessel 200, such as a high efficiency regeneration vessel, a two stage regeneration vessel, or a bubbling bed regeneration vessel. An exemplary two stage regeneration vessel is disclosed in, e.g., U.S. application Ser. No. 13/425,657 filed 21 Mar. 2012. In such an instance, the first conveyor 400 can transfer catalyst from the second stage to the first stage. The cool catalyst may travel along the screw and return to the regeneration vessel along the standpipe for high efficiency or two stage regeneration vessels. For a bubbling bed regeneration vessel, a cool catalyst lift riser may be required to return the catalyst back to the bed.

Although two conveyors 400 and 500 are depicted, it should be understood that any suitable number of conveyors may be utilized. Particularly, multiple conveyors 400 can be used in parallel to correspond to the higher catalyst throughput.

The embodiments provided herein allow hot catalyst withdrawal through a conveyor via a dense phase removal instead of the dilute phase using, e.g., finned piping. The catalyst can be withdrawn at a controlled rate using a variable speed controller at a low revolution per minute setting. The internal screw can operate at low speed while moving hot catalyst with the rotating blade coupled to the shaft. Usually, the only air injection utilized is air transferring the cooled catalyst after the cooling screw conveyor to the equilibrium catalyst hopper. The low overall revolutions per minute can minimize erosion. Heat transfer from the hot catalyst to the cooling water may occur along the shaft, jacket, and optionally helical threads of the conveyor. Hot water from the outlet of the conveyors can be sent to the appropriate utilities to generate, e.g., high pressure steam.

Typically, the variable speed motor allows the screw to control the catalyst circulation rate as required for operation without using a conventional slide valve. The catalyst cooler circulation rate can be stopped completely, if required, by shutting down the variable speed motor.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for transferring catalyst in a fluid catalytic cracking apparatus, comprising:
   passing the catalyst through a conveyor wherein the conveyor contains a screw for transporting the catalyst, wherein the screw comprises a shaft adapted to receive cooling water.

2. The process according to claim 1, wherein the catalyst is obtained from a regeneration vessel.

3. The process according to claim 2, wherein the catalyst is returned to the regeneration vessel from the conveyor.

4. The process according to claim 1, wherein the catalyst is passed from the conveyor to storage and subsequently disposed.

5. The process according to claim 1, wherein the conveyor further comprises a jacket.

6. The process according to claim 5, wherein the jacket is adapted to receive cooling water.

7. The process according to claim 6, wherein the shaft is coupled to a thread.

8. The process according to claim 6, wherein the cooling water is heated by the catalyst within the conveyor and the heated water is provided to a utility.

9. The process according to claim 1, wherein the conveyor further comprises a variable speed motor.

10. The process according to claim 2, further comprising passing regenerated catalyst from the regeneration vessel to a riser of a fluid catalytic cracking riser-reactor.

11. The process according to claim 1, wherein the catalyst is passed from the conveyor to a regeneration vessel.

12. The process according to claim 1, wherein the conveyor cools the catalyst from at least about 700° C. to no more than about 600° C.

13. The process according to claim 1, wherein the conveyor cools the catalyst from at least about 700° C. to no more than about 100° C.

14. The process according to claim 1, wherein the conveyor transports about 130,000-about 450,000 kg/hr.

15. The process according to claim 1, wherein the conveyor transports about 15-about 200 kg/hr.

16. A fluid catalytic cracking apparatus, comprising:
   A) a riser-reactor comprising a riser terminating in a reaction vessel;
   B) a regeneration vessel communicating with the riser-reactor for receiving spent catalyst from the riser-reactor and for sending regenerated catalyst to the riser-reactor, wherein the regeneration vessel comprises a line for transferring catalyst to the regeneration vessel; and
   C) a conveyor positioned in the line for facilitating transfer of the catalyst, wherein the conveyor contains a shaft coupled to a thread.

17. The apparatus according to claim 16, further comprising another line for disposing spent catalyst wherein a second conveyor is positioned within the disposal line for transferring catalyst, and the conveyor contains a shaft coupled to a thread.

18. The apparatus according to claim 17, wherein each conveyor further comprises a water jacket and each shaft defines a void for receiving a cooling fluid.

19. A process for transferring catalyst in a fluid catalytic cracking apparatus, comprising:
- A) passing the catalyst through a horizontal conveyor wherein the conveyor contains a screw for transporting the catalyst communicating with different portions of a shell of a regeneration vessel; and
- B) passing the catalyst through another conveyor wherein the conveyor contains a screw for transporting catalyst for disposal.

20. The process according to claim 19, wherein each conveyor further comprises a water jacket for receiving cooling water.

\* \* \* \* \*